G. C. HOARE & T. ACKLAND.
STOP COCK AND VALVE FOR LIQUIDS, GASES, AND STEAM.
APPLICATION FILED DEC. 16, 1909.

1,031,932.

Patented July 9, 1912.

Witnesses
R. V. Sommers
May Ellis

Inventors
George Charles Hoare,
Thomas Ackland
By Henry Orth
Atty.

UNITED STATES PATENT OFFICE.

GEORGE CHARLES HOARE AND THOMAS ACKLAND, OF HARRINGAY, ENGLAND.

STOP-COCK AND VALVE FOR LIQUIDS, GASES, AND STEAM.

1,031,932. Specification of Letters Patent. Patented July 9, 1912.

Application filed December 16, 1909. Serial No. 533,388.

*To all whom it may concern:*

Be it known that we, GEORGE CHARLES HOARE and THOMAS ACKLAND, both subjects of the King of Great Britain, residing, respectively, at 475 Green Lanes and 68 Burgoyne road, Harringay, in the parish of Tottenham and county of Middlesex, England, have invented new and useful Improvements in Stop-Cocks and Valves for Liquids, Gases, and Steam, of which the following is a specification.

The object of this invention is to produce a stop-cock or valve of the kind known as "screwdown" for liquids, gases, and steam in such a manner as to avoid the use of any flexible or elastic material or packing for the purpose of making a close and tight joint when the valve or jumper is screwed down on its seating.

Figure 1:
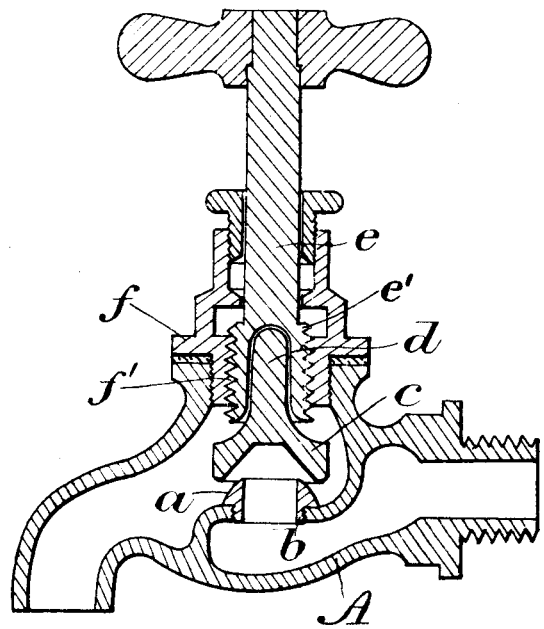
Figure 2:
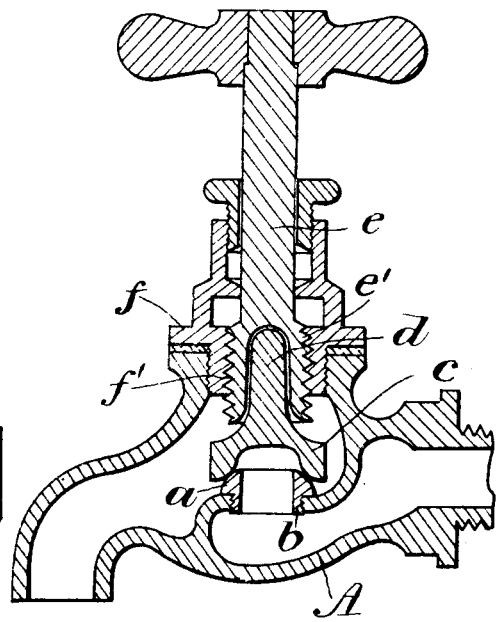

Figure 1 of the accompanying drawings is a sectional elevation of a draw-off or bib cock or valve of the kind in general use for water constructed according to this invention, and Fig. 2 is a similar view of a slightly modified form.

The spherical seating marked $a$, is provided with a hollow externally screwed shank $b$, which is screwed into the body of the casing A, but this seating may be otherwise fixed in its place by for instance making it a tight fit and forcing it into place, or by means of solder, or it may be formed in one with the casing.

The valve or jumper $c$, is made in the form of a hollow frustum of a cone which when pressed on to the spherical surface of the seating rests upon and partially embraces it. This valve is provided with a shank $d$ which has a hemispherical top and is freely seated in a recess drilled in the screw-threaded valve spindle $e$ which recess conforms to the shape of the shank and is of a depth slightly less than the length of the valve shank $d$, so that when the cock is closed by screwing down the spindle $e$ force is applied to the end of valve shank $d$, and as the recess in the spindle of the valve is made of slightly larger dimensions than the valve shank the valve has freedom laterally and seats itself truly even if the spindle be out of true. The valve spindle $e$ is provided on its lower end with external screw threads $e'$ which work in the internal screw threads $f$ formed in the lower portion of a stuffing box $f'$ which latter is screwed into the casing A.

The construction shown in Fig. 2 is very similar, the only difference being that the loose valve or jumper $c$ has its interior surface curved instead of straight.

The above described seating and valve may be made of a similar metal or alloy to that of the body of the cock, or of any other metal, alloy or material suitable for the purpose to which the cock is to be applied.

The above described construction of valve and its attachment to spindle of cock as shown is employed for use as a draw-off and stop cock as commonly used for domestic water supply but in steam and water cocks and particularly when made of large dimensions the attachment of the conical valve to the screw-threaded spindle of cock may be of any appropriate form.

What we claim and desire to secure by Letters Patent of the United States is:—

1. In a screw-down valve, the combination of a valve casing, a perforated, rigid, part-spherical valve seating mounted in said casing, a valve spindle, a rigid hollow valve adapted to be operated by said valve spindle, the recess or hollow in said valve being bounded by a wall approximately in the form of a hollow frustum of a cone and of such basal diameter that in the closed position of said valve said wall engages along a line of contact upon the outer spherical surface of said seating, said line being always situated between the maximum and minimum diameters of said cone frustum, substantially as set forth.

2. In a screw-down valve, the combination of a valve casing, a perforated, rigid, part-spherical valve seating mounted in said casing, a valve spindle, a rigid hollow valve free of, but adapted to be operated by the valve spindle, the recess or hollow in said valve being bounded by a wall approximately in the form of a hollow frustum of a cone and of such basal diameter that in the closed position of said valve said wall engages along a line of contact upon the outer spherical surface of said seating, said line being always situated between the maximum and minimum diameters of said wall, substantially as set forth.

3. In a screw-down valve, the combination of a valve-casing, a perforated, rigid, part-spherical valve seating mounted in said casing, a stuffing box having an internally screw-threaded portion at its base, a cylindrical valve spindle passing through said stuffing box and externally screw-threaded to engage said internal screw-thread, said valve spindle having a recess tapering from the bottom upward and hemispherical at the top, a rigid valve head provided at the top with a shank of such shape and dimensions as to loosely fit within said tapering recess in the valve spindle, said valve having a recess approximately in the form of a hollow frustum of a cone of such basal diameter that the coned wall surrounding said recess when said valve head is in the closed position engages along a line of contact upon the outer spherical surface of said seating, substantially as set forth.

4. A stop-cock comprising a casing, a perforated, rigid, part-spherical valve seating, a rigid valve having an approximately frusto-conical recess in its bottom of such basal diameter that the coned wall surrounding said recess when said valve is in its closed position engages along a line of contact upon the outer spherical surface of said seating, said valve having at the top a shank provided with a substantially hemispherical top, and a valve spindle having a recess in its lower end for receiving said shank, said recess being of a depth slightly less than the length of the shank whereby the pressure of the cock is exerted on the top of the shank, and of such lateral dimensions that lateral play of the latter is permitted for the purpose specified.

In testimony whereof we have signed our names to this specification in the presence of two subscribing witnesses.

GEORGE CHARLES HOARE.
THOMAS ACKLAND.

Witnesses:
W. MORBEY,
H. D. JAMESON.